B. WHITNEY,

Assignor to W. L. TETER.

Grinding-Mill.

No. 8,097. Reissued Feb. 19, 1878.

*Witnesses:-*

G. W. Case

Frank H. Palouze

*Inventor:*

Bennet Whitney, by his Atty.

Wm. F. Rowe

N. PETERS, PHOTO-LITHOGRAPHER, WASHINGTON, D. C.

UNITED STATES PATENT OFFICE.

BENNET WHITNEY, OF RAHWAY, N. J., ASSIGNOR TO WILLIAM L. TETER.

IMPROVEMENT IN GRINDING-MILLS.

Specification forming part of Letters Patent No. 83,574, dated October 27, 1868; Reissue No. 8,097, dated February 19, 1878; application filed November 7, 1877.

DIVISION A.

*To all whom it may concern:*

Be it known that I, BENNET WHITNEY, of Rahway, in the county of Union and State of New Jersey, have invented certain new and useful Improvements in Grist-Mills, of which the following is a specification:

The object of my invention is to save the face of the burrs from being marred or destroyed by hard substances passing between them, and, furthermore, afford free vent for material that would choke the stones and interfere with the regularity of their grinding action; and the improvement consists in constructing a grist-mill in such manner that the stationary stone will be allowed to swing laterally, and is also capable of adjustment vertically by such means that no meal can escape through the opening in the curb, and the stone be restored to its normal position in tram when no irregular force is operating upon it.

Figure 1:
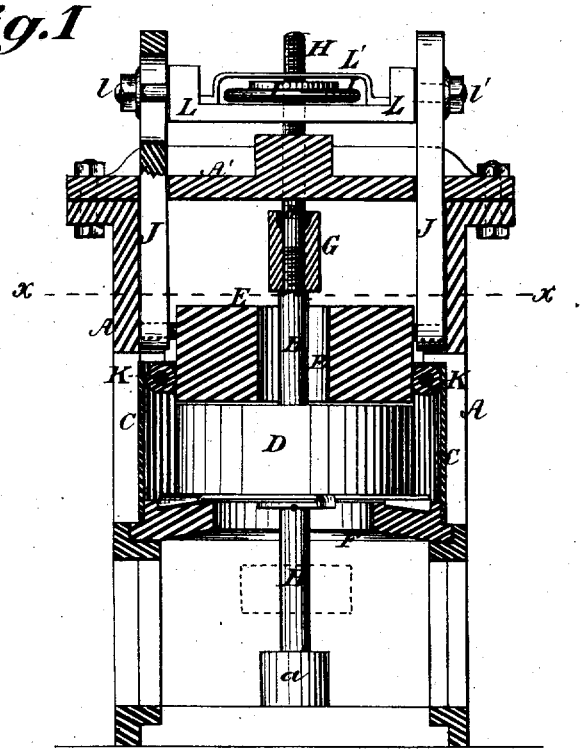
Figure 2:
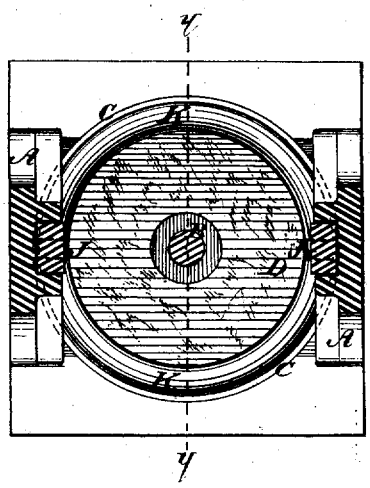

In the accompanying drawings, Figure 1 is a vertical sectional view of my improved mill in the line *y y* of Fig. 2; and Fig. 2, a horizontal sectional view in the line *x x* of Fig. 1.

A suitable frame, A, has a step, *a*, for the support of the spindle B, and also incloses and supports the curb or cylindrical shell C, that surrounds the lower stone D and the lower part, at least, of the upper stone E.

An annular plate, F, fitted into the lower part of the curb below the lower stone D, forms a trough around the stone to receive the ground meal.

The accompanying drawings exhibit my improvement as applied to a mill in which the upper stone is the stationary stone, and the lower stone is the runner. The spindle B passes up through a boxing in the lower stone D, with which it is connected in a well-known manner to revolve it. The spindle then passes freely through the open eye of the upper stone E, and projects above it.

The upper end of the spindle is provided with a screw-thread, upon which is secured a metal box, G, having a socket in its upper part for the reception of the lower end of a pin, H, which passes freely through the upper plate A′ of the frame-work.

The pin H is provided with a screw-thread upon its upper end, and is secured and adjusted upon a cross-bar, L, by means of a nut-wheel, I, secured between the bar L and a parallel plate, L′, attached to the bar.

The bar L is provided at its ends with pins and nuts, by which means it is secured to vertical suspension-bars J J, that fit into vertical grooves in the side plates of the frame, and support the upper stone by means of pins *e e* projecting from the sides of the stone and arranged diametrically opposite each other.

The suspension-bars J J are provided with slots at their upper ends, through which the pins or ends of the bars L pass, and may be adjusted thereon by clasping-nuts *l l′*.

By means of the suspension arrangement above described, the stones may be adjusted relatively to each other, and thus regulate the fineness of the meal.

Between the upper stone E and the curb C there is interposed a rubber hose or an elastic band or wall, K, which prevents the meal from escaping between the curb and the stone, and, while it permits the stone to tip or move laterally in any desired direction, it will press against the stone, aiding to restore it to its normal position when the obstruction has been removed without injuring the face of the stone or permanently displacing it.

I claim as my invention and desire to secure by Letters Patent—

The combination, with a millstone and its curb, of an elastic packing arranged between the periphery of the stone and the curb, substantially as set forth.

BENNET WHITNEY.

Witnesses:

ALEXR. H. STRYKER,
JOHN I. DE HART.